(12) United States Patent
Williamson

(10) Patent No.: US 7,387,308 B2
(45) Date of Patent: Jun. 17, 2008

(54) SINGLE WHEEL TRAILER AND STABILIZING HITCH

(76) Inventor: Jimmy C. Williamson, 457 NE. Chicory Trail, Madison, FL (US) 32340

(*) Notice: Subject to any disclaimer, the term of this patent is extended or adjusted under 35 U.S.C. 154(b) by 457 days.

(21) Appl. No.: 11/103,629

(22) Filed: Apr. 12, 2005

(65) Prior Publication Data

US 2005/0285362 A1    Dec. 29, 2005

Related U.S. Application Data

(60) Provisional application No. 60/582,070, filed on Jun. 24, 2004.

(51) Int. Cl.
*B60D 1/50* (2006.01)
*B60D 1/44* (2006.01)
*B62D 61/00* (2006.01)

(52) U.S. Cl. .................. 280/483; 280/446.1; 280/78

(58) Field of Classification Search .............. 280/483, 280/78, 446.1
See application file for complete search history.

(56) References Cited

U.S. PATENT DOCUMENTS

| | | | |
|---|---|---|---|
| 1,048,951 A | 12/1912 | Edwards | |
| 1,794,630 A | 3/1931 | Linn | |
| 2,287,234 A | 6/1942 | Ducharme | |
| 2,486,605 A | 11/1949 | Ladd | |
| 2,506,718 A * | 5/1950 | Grant | 280/476.1 |
| 2,523,733 A | 9/1950 | Stephens | |
| 2,531,289 A * | 11/1950 | Adolf | 280/484 |
| 2,558,153 A | 6/1951 | Peterson | |
| 2,635,892 A | 4/1953 | Shutter | |
| 2,967,719 A * | 1/1961 | Williams | 114/344 |
| 2,988,382 A * | 6/1961 | Holland | 280/400 |
| 3,180,657 A * | 4/1965 | Molter, Sr. | 280/489 |
| 3,250,548 A | 5/1966 | Boyd | |
| 3,700,053 A | 10/1972 | Glissendorf | |
| 3,708,183 A | 1/1973 | Jones | |
| 4,027,899 A * | 6/1977 | Hawes et al. | 280/124.102 |
| 4,148,498 A | 4/1979 | Taylor, Jr. | |
| 4,215,876 A | 8/1980 | Jacks | |
| 4,351,542 A | 9/1982 | Lovell et al. | |

(Continued)

FOREIGN PATENT DOCUMENTS

AU    2003204843 A1 *   1/2004

(Continued)

*Primary Examiner*—Lesley D. Morris
*Assistant Examiner*—Daniel Yeagley
(74) *Attorney, Agent, or Firm*—Richard C. Litman

(57) ABSTRACT

The single wheel trailer and stabilizing hitch assembly includes a hitch which precludes lateral tilt or roll of a trailer about the longitudinal axis of the towing vehicle and trailer, the trailer having only a single wheel for support. The hitch includes a pair of horizontal plates which bear against one another, with a vertical pivot pin securing the two plates together to allow the trailer to turn laterally relative to the towing vehicle. A separate horizontal pivot axis accommodates pitch of the trailer relative to the towing vehicle while negotiating bumps and dips. However, the trailer tongue is fixed relative to the roll axis of the assembly, and the trailer cannot tilt or lean to the side while being supported by its single wheel. This greatly reduces wheel bearing and tire wear, and reduces rolling resistance of the trailer as well. Different trailer configurations are also provided.

9 Claims, 6 Drawing Sheets

U.S. PATENT DOCUMENTS

| | | | |
|---|---|---|---|
| 4,372,569 A | | 2/1983 | Otterson |
| 4,426,097 A | * | 1/1984 | Livingston ............... 280/416.1 |
| 4,484,759 A | | 11/1984 | Zwick |
| 4,512,593 A | * | 4/1985 | Ehrhardt .................. 280/460.1 |
| 5,288,095 A | | 2/1994 | Swindall |
| 5,368,325 A | | 11/1994 | Hazen |
| 5,887,884 A | * | 3/1999 | Smith ......................... 280/489 |
| 5,984,342 A | * | 11/1999 | Ysker ......................... 280/492 |
| 6,042,135 A | | 3/2000 | Ross |
| 6,042,138 A | * | 3/2000 | Shreck ....................... 280/492 |
| 6,357,778 B1 | | 3/2002 | Ross |

FOREIGN PATENT DOCUMENTS

| | | | |
|---|---|---|---|
| FR | 2608547 | | 6/1988 |
| GB | 1140551 | | 1/1961 |
| GB | 2334487 A | * | 8/1999 |

\* cited by examiner

SINGLE WHEEL TRAILER AND STABILIZING HITCH

CROSS-REFERENCE TO RELATED APPLICATION

This application claims the benefit of U.S. Provisional Patent Application Ser. No. 60/582,070, filed Jun. 24, 2004.

BACKGROUND OF THE INVENTION

1. Field of the Invention

The present invention relates generally to vehicle trailers and hitches, and more specifically to a hitch configuration which prevents rolling movement about the longitudinal axis of the hitch and trailer connected thereto. This permits the trailer to have only a single wheel for support, as two laterally disposed wheels are not needed to prevent roll about the longitudinal axis of the trailer. Various relatively light-duty trailers capable of carrying up to several hundred pounds of cargo are also disclosed herein.

2. Description of the Related Art

Vehicle trailers are almost universally provided with at least two laterally spaced wheels in order to provide lateral stability for the trailer. Further stability is provided by the hitch connection to the towing vehicle, thus defining three points of stability for the trailer (the two wheels and the hitch). This is sufficient to maintain the stability of the trailer while being towed.

As the trailer generally must articulate behind the towing vehicle (unless some relatively complex articulation is provided for the trailer wheels), a ball-type trailer hitch is generally used for most light to medium capacity trailers. Ball hitches are nearly universally available in various diameters, depending upon the internal diameter of the hitch ball receptacle on the trailer tongue. With the three degrees of angular freedom permitted, i.e., in pitch, yaw, and roll, ball hitches provide all of the articulation necessary between the towing vehicle and the trailer.

While articulation in yaw is required for the towing vehicle and trailer to negotiate turns, and at least some degree of pitch articulation is required to negotiate bumps and dips in the surface, the only need for articulation in roll, i.e., angular motion about the longitudinal axis between the trailer and towing vehicle, is due to the conventional two laterally spaced wheels used in nearly all small trailers. If the trailer did not require laterally spaced wheels, then it could roll about the same longitudinal axis as the towing vehicle. A single wheel would provide sufficient support for such a trailer. Such a single wheel trailer could be made narrower for more compact storage; wheel, tire, bearing, and (where provided) brake wear would be cut in half; and less rolling resistance would be encountered, thereby providing increases in fuel efficiency for the towing vehicle. Yet, these various advantages are not possible with a conventional ball-type hitch, or other hitch which allows rolling movement between the towing vehicle and the trailer.

The present invention provides a solution to this problem by means of a stabilizing hitch which permits only two degrees of freedom of motion between the trailer and towing vehicle, i.e., in yaw (for turning) and in pitch (for negotiating bumps and dips). The trailer tongue connected to the present hitch cannot rotate about the longitudinal axis of the assembly, but is locked relative to the roll axis of the towing vehicle. Thus, lateral stability of the trailer is provided by the hitch, rather than by laterally spaced wheels. This permits the trailer to be supported by only a single wheel, with all of the accompanying benefits noted above for such a single wheel trailer configuration.

The related art may be divided into two categories, depending upon whether the hitch allows the trailer to roll about its longitudinal axis relative to the tow vehicle and/or the trailer has at least two laterally spaced wheels, or whether the hitch restricts the roll about the longitudinal axis of the trailer and/or the trailer has only a single wheel for support. Those trailers and/or hitches which allow the trailer to roll about its longitudinal axis relative to the tow vehicle, and/or where the trailer has at least two laterally spaced wheels for support, are not felt to be particularly closely related to the present invention. Such trailers and/or hitches are described in the following U.S. and foreign patents and publications:

U.S. Pat. No. 2,635,892 issued on Apr. 21, 1953 to Russell Shutter, titled "Resilient Ball And Socket Type Draft Means;" U.S. Pat. No. 3,250,548 issued on May 10, 1966 to Barkley Boyd, titled "Trailer Hitch;" U.S. Pat. No. 3,700,053 issued on Oct. 24, 1972 to Wilmer E. Glissendorf, titled "Weight-Indicating Trailer Coupler;" U.S. Pat. No. 3,708,183 issued on Jan. 2, 1973 to Morris Jones, titled "Trailer Hitch;" U.S. Pat. No. 4,148,498 issued on Apr. 10, 1979 to Thomas A. Taylor, Jr., titled "Trailer Hitch; U.S. Pat. No. 4,215,876 issued on Aug. 5, 1980 to Donald E. Jacks, titled "Trailer Hitch;" U.S. Pat. No. 4,351,542 issued on Sep. 28, 1982 to Robert Lovell et al., titled "Flexible Towing Hitch;" U.S. Pat. No. 5,288,095 issued on Feb. 22, 1994 to Jackie J. Swindall, titled "Trailer Hitch;" U.S. Pat. No. 6,042,135 issued on Mar. 28, 2000 to Louis J. Ross, titled "Hitch Assembly And Trailer;" U.S. Pat. No. 6,357,778 issued on Mar. 19, 2002 to Louis J. Ross, titled "Hitch And Trailer Assembly;" and British Patent No. 1,140,551, published on Jan. 22, 1969, titled "Improvements In Or Relating To Hitches For Trailer Vehicles."

None of the above-described devices has any means for preventing the lateral roll of the trailer about its longitudinal axis relative to the towing vehicle, as noted further above. However, the present inventor is aware of an additional number of references which describe means for preventing lateral roll of the trailer relative to the towing vehicle, and/or which provide only a single trailer wheel. These references are discussed individually below.

U.S. Pat. No. 1,048,951 issued on Dec. 31, 1912 to Darsie E. Edwards, titled "Pole Truck," describes an elongate pole having a vertical shaft passing therethrough. A trailing arm having a single wheel extending therefrom is resiliently suspended on the shaft. While an eye is shown at the end of the pole behind the wheel, no forwardly disposed hitch is disclosed. The fact that the wheel swivels about its vertical attachment shaft would preclude any need for lateral articulation at the hitch attachment for the Edwards pole truck, whereas the trailer wheels of the present invention do not turn relative to the trailer and require a laterally articulating hitch.

U.S. Pat. No. 1,794,630 issued on Mar. 3, 1931 to Holman H. Linn, titled "Construction For Automobile Trailers And The Like," describes a towing vehicle and trailer equipped with two laterally spaced ball hitches. The double hitch trailer attachment precludes movement of the trailer about the vertical (yaw) or longitudinal (roll) axes relative to the towing vehicle, and allows only pitching motion of the trailer. Thus, the single trailer wheel must swivel or pivot relative to the trailer in order to allow the trailer to turn behind the towing vehicle, without scrubbing the trailer tire sideways across the underlying surface. In contrast, the present hitch allows angular freedom of motion about both the pitch (lateral) and yaw (vertical) axes, while precluding motion about the roll (longitudinal) axis in order to require only a single, non-steerable trailer wheel.

U.S. Pat. No. 2,287,234 issued on Jun. 23, 1942 to Gilbert D. Ducharme, titled "Trailer Hitch," describes a sliding pillar-type hitch, in which the trailer tongue attachment slides vertically on a post or pin attached to the towing vehicle. The tongue attachment is biased between a pair of springs for vertical suspension; no angular freedom of motion about the lateral or pitch axis is possible with this hitch configuration. While Ducharme also discloses a ball-type hitch in one embodiment of his hitch configuration, other embodiments would preclude motion about the roll axis of the trailer and towing vehicle. However, Ducharme does not disclose a single wheel trailer for use with his hitch, and none of his hitch configurations are structurally or functionally similar to the hitch of the present invention.

U.S. Pat. No. 2,486,605 issued on Nov. 1, 1949 to Reuel O. Ladd, titled "Axle Trailer Connector," describes a complex pintle hitch assembly, in which the towing vehicle has a spring-loaded pin which passes through a ring on the trailer tongue. The relatively tight spacing of the trailer tongue ring between two plates on the pintle hitch precludes any significant movement about either the pitch or roll axes of the trailer; only yaw for turning is permitted. Accordingly, Ladd requires another articulated joint in the tongue structure of the trailer to allow the trailer to move in pitch relative to the towing vehicle. In any event, no single wheel trailer is disclosed by Ladd, and his hitch configuration is structurally and functionally different from the present hitch arrangement.

U.S. Pat. No. 2,523,733 issued on Sep. 26, 1950 to Leo L. Stephens, titled "Trailer Coupling Stabilizer," describes a hitch assembly permitting only a single degree of arcuate motion about the pitch axis of the assembly. No yaw articulation is permitted; thus, a swiveling trailer wheel(s) similar to the wheel(s) of the Edwards '951 or Linn '630 U.S. patents, discussed further above, would be required for a trailer used with the Stephens hitch assembly. The present hitch permits arcuate motion about all but the roll or longitudinal axis of the trailer and towing vehicle, thus greatly simplifying the single wheel mechanism required for the trailer.

U.S. Pat. No. 2,558,153 issued on Jun. 26, 1951 to Frank O. Peterson, titled "One Wheel Collapsible Trailer," describes a double hitch trailer assembly, generally similar to the double hitch trailer and towing vehicle assembly disclosed in the Linn '630 U.S. patent discussed further above. The Peterson hitches use laterally disposed pins which permit motion only about the pitch axis of the assembly, and require a swiveling wheel for trailer support. The present hitch assembly does not require any duplication of the hitch attach points on the towing vehicle, and may make use of the conventional single point hitch attachment (e.g., receiver type hitch, or ball hitch attachment plate, once the ball is removed) provided on the towing vehicle. Moreover, as the present hitch assembly permits the trailer to yaw freely behind the towing vehicle for turning maneuvers, the single wheel installation for the trailer is greatly simplified, as it need not swivel beneath the trailer.

U.S. Pat. No. 4,372,569 issued on Feb. 8, 1983 to Robert C. Otterson, titled "Single Wheel Trailer Support," describes a trailing arm or castering wheel assembly having a pair of opposed springs acting in tension and compression to serve as the resilient suspension for the wheel. The entire assembly is attached to the trailer by a single vertically disposed bolt, to allow the wheel and suspension assembly to swivel beneath the trailer. Such a wheel assembly would be necessary with the hitches of the Linn '630, Stephens '733, and Peterson '153 U.S. patents, discussed further above, which do not permit the trailer to yaw behind the towing vehicle. However, the present invention does not require a swiveling wheel for the trailer, as the hitch permits the trailer to yaw or turn relative to the towing vehicle.

U.S. Pat. No. 4,484,759 issued on Nov. 27, 1984 to David J. Zwick, titled "Hitch Assembly For A Single Wheel Trailer," describes a double hitch bar which is removably attachable to the rear bumper of a towing vehicle, for towing a single wheel trailer. A trailer attached to this hitch can articulate only in pitch about the lateral axis of the assembly; no yawing or turning motion is permitted. Accordingly, a swiveling trailer wheel is required for a trailer used with the Zwick hitch assembly. In contrast, the present hitch permits trailer movement about both the pitch and yaw axes but precludes motion about the roll axis, thereby permitting a single, directionally fixed wheel to be fitted to the trailer.

U.S. Pat. No. 5,368,325 issued on Nov. 29, 1994 to Donald B. Hazen, titled "Universal Single-Wheel Single Beam Trailer Having Adjustable Bed," describes a double hitch configuration similar to the hitches of the Linn '630, Peterson '153, and Zwick '759 U.S. patents, each of which has been discussed further above. Such a laterally rigid hitch configuration requires a swiveling trailer support wheel or wheels similar to the swiveling trailer wheel of the Otterson '569 U.S. patent, rather than permitting the trailer to swivel relative to the towing vehicle, as in the present invention.

Finally, French Patent No. 2,608,547 published on Jun. 24, 1988, describes (according to the drawings and English abstract) a hitch for a light trailer, with the hitch having a pair of horizontally disposed plates which bear against one another to permit the trailer to yaw relative to the towing vehicle while precluding movement about the roll axis between trailer and towing vehicle. The trailer has a single directionally fixed wheel on a trailing arm suspension. However, the trailer suspension is quite complex in comparison to the trailer suspension of the present invention, and no resilient biasing of the trailer tongue to the hitch is provided. The present hitch assembly includes a spring assembly between the trailer tongue and the box in which it attaches, and moreover the present disclosure includes a variety of trailer configurations for different purposes.

None of the above inventions and patents, taken either singly or in combination, is seen to describe the instant invention as claimed. Thus, a single wheel trailer and stabilizing hitch solving the aforementioned problems is desired.

SUMMARY OF THE INVENTION

The present single wheel trailer and stabilizing hitch assembly provides a hitch which precludes lateral roll or tilting of the trailer about the longitudinal axis of the trailer and towing vehicle, thereby allowing the trailer to be supported by only a single wheel. The hitch allows the trailer to yaw or turn laterally behind the towing vehicle, thereby allowing the single trailer wheel to be directionally fixed relative to the trailer. The hitch comprises a pair of plates which bear against one another in the horizontal plane, thereby allowing the trailer to pivot laterally in the horizontal plane behind the towing vehicle, in order to track behind the towing vehicle during turning maneuvers. A separate horizontal pivot axis is provided for the attachment of the trailer tongue to the hitch to allow the trailer to articulate in pitch behind the towing vehicle to negotiate bumps and dips. However, the tongue is secured to the hitch by the horizontal pivot, which precludes rotation or roll of the trailer about its longitudinal axis.

The single wheel of the trailer is mounted on a trailing arm and is directionally fixed, since the trailer may pivot laterally behind the towing vehicle for turns. Several different trailer configurations may be provided according to the present invention, ranging from a flat bed surface which may include various attachment points for carrying certain objects, e.g., bicycles, etc. The bed may have an enclosure mounted thereon for securing and protecting articles therein, if so desired. Another alternative trailer configuration is constructed essentially in accordance with the basic single wheel, trailing arm configuration noted above, but includes a bed which is adjustably positionable in height to facilitate loading and unloading of articles thereon and therefrom.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
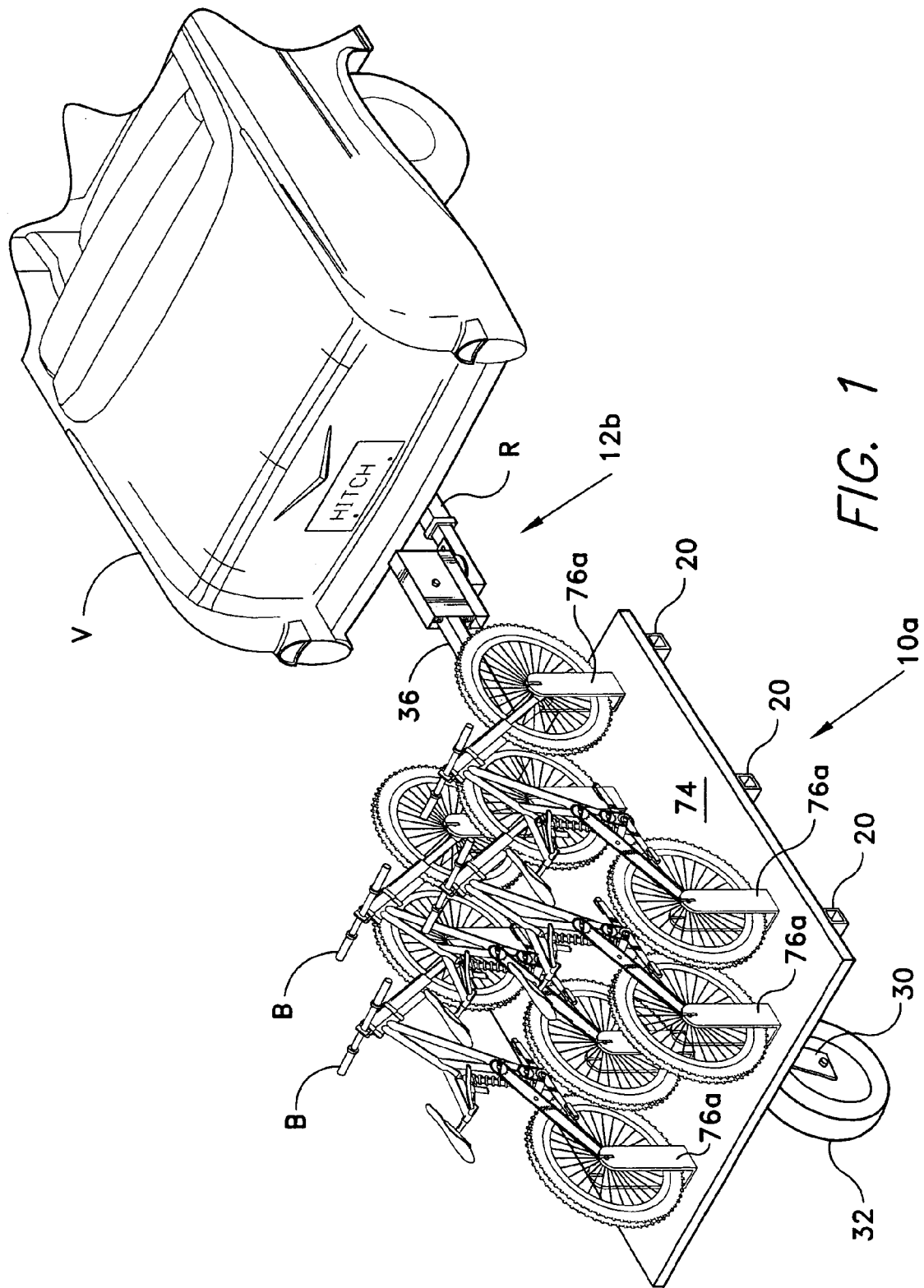
FIG. 1 is a perspective view of a single wheel trailer and stabilizing hitch according to the present invention, illustrating a first embodiment of the single wheel trailer.

The present invention comprises a trailer having only a single, generally centrally aligned and directionally fixed wheel for support, and includes a hitch which is rigid about the longitudinal or roll axis of the trailer to preclude lateral tipping of the single wheel trailer used therewith. FIG. 1 provides a perspective view of the general configuration of a first embodiment of a single wheel trailer 10a and stabilizing hitch 12b in accordance with the present invention. The trailer 10a includes a frame 14 (shown in FIG. 4) comprising an elongate bar or tube having a forward end 16 and opposite rearward end 18. The longitudinal frame member 14 may include a series of lateral ribs or supports 20 extending thereacross, depending upon the specific configuration desired for the trailer.

Figure 4:
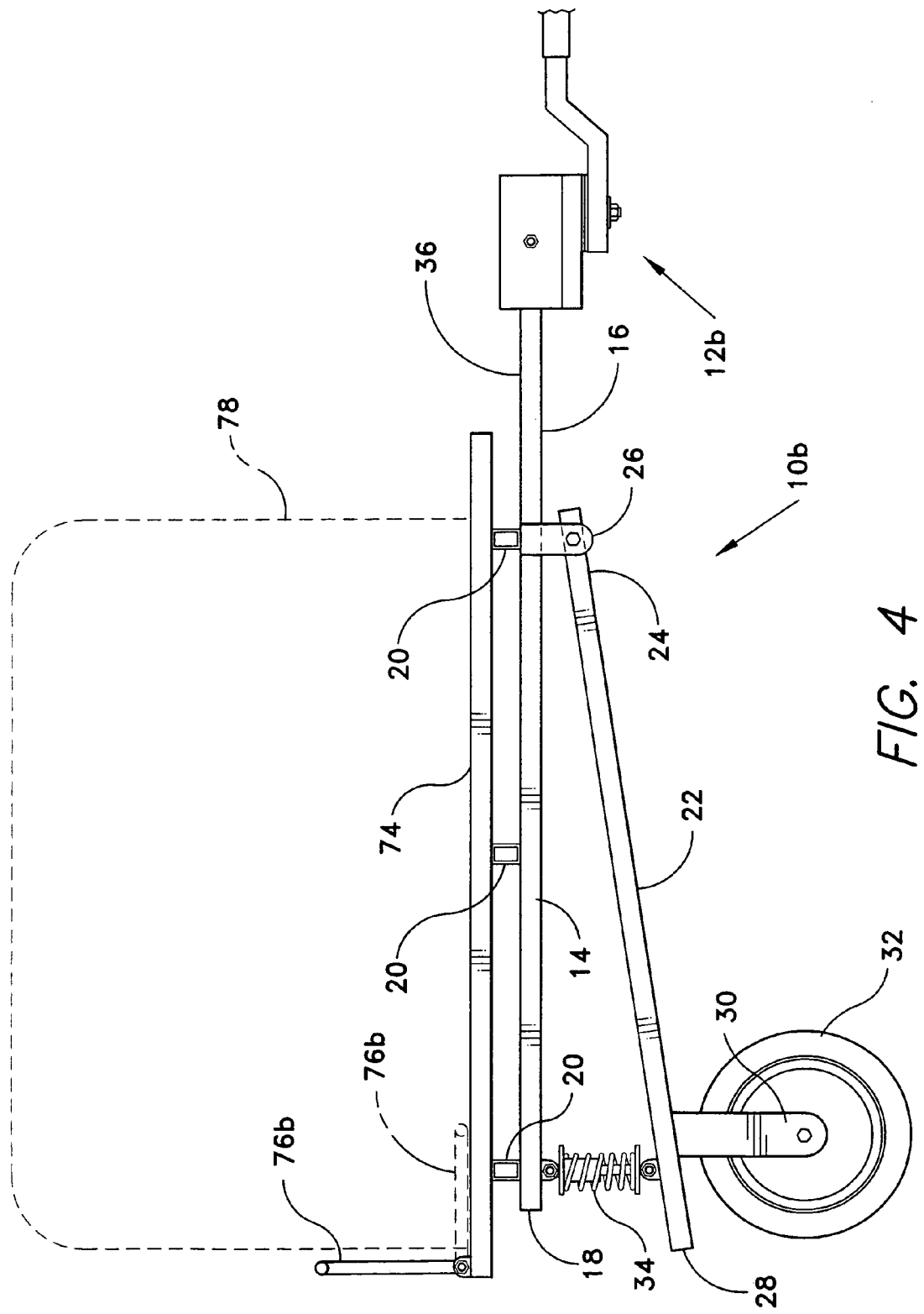
FIG. 4 is a right side elevation view of the present hitch assembly and another trailer embodiment, illustrating the trailing arm suspension for the trailer.

The elongate frame member 14 includes a trailing suspension arm 22 depending from its forward portion 16, as shown in FIG. 4. The suspension arm 22 has a forward trailer frame attachment end 24 which is pivotally secured to the trailer frame member 14 by a pivot bracket 26. The opposite wheel attachment end 28 has a wheel fork 30 depending therefrom, with a single wheel and tire assembly 32 rotatably secured within the fork 30. Alternatively, a single axle support could be provided, with the wheel axle cantilevered laterally from the axle support. A resilient suspension, e.g., a concentric coil spring and shock absorber assembly 34, may be installed between the frame member 14 and trailing arm 22, generally as shown in FIG. 4.

Figure 2:
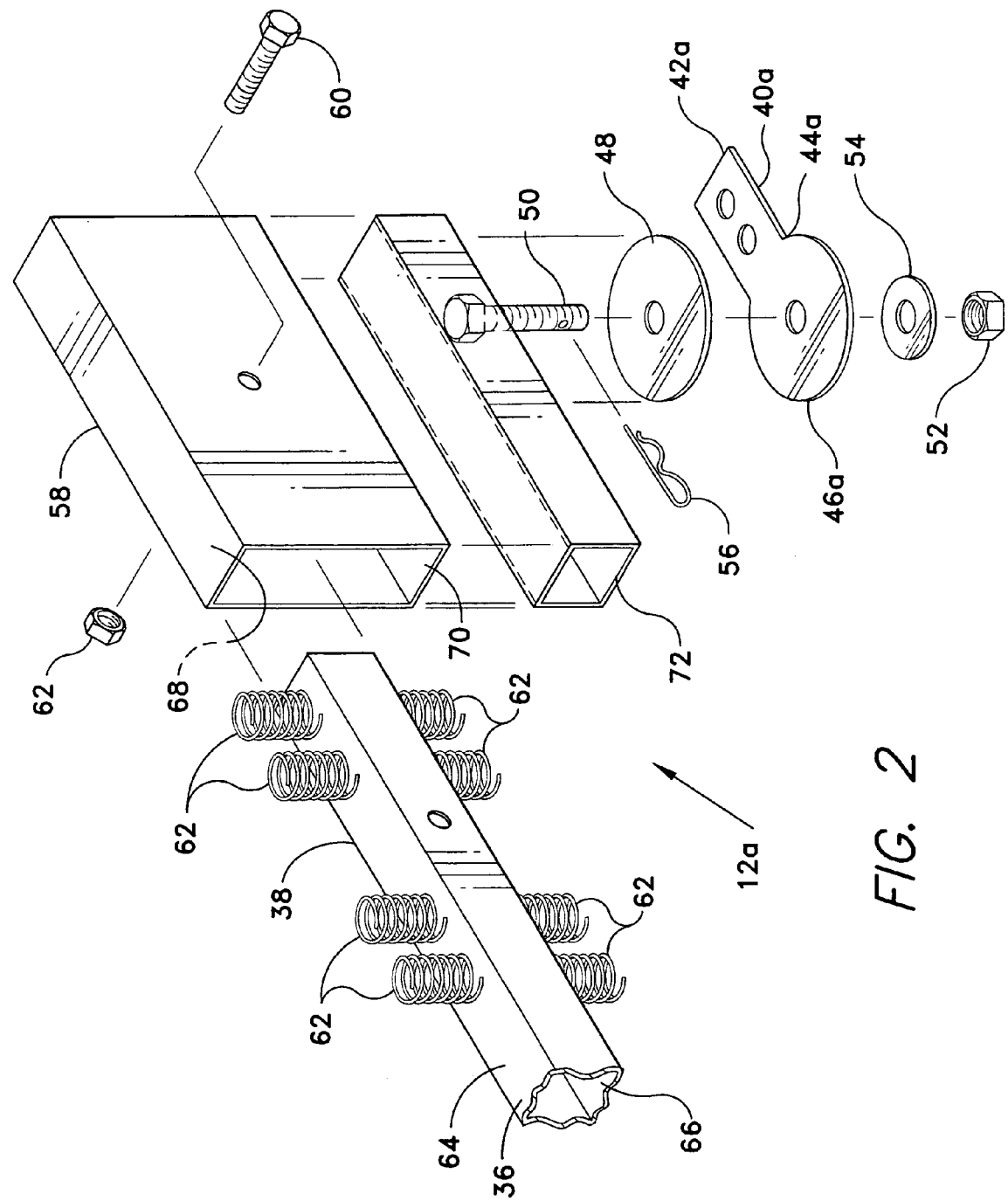
FIG. 2 is an exploded perspective view of the hitch assembly of the present invention, illustrating details thereof.
Figure 3:
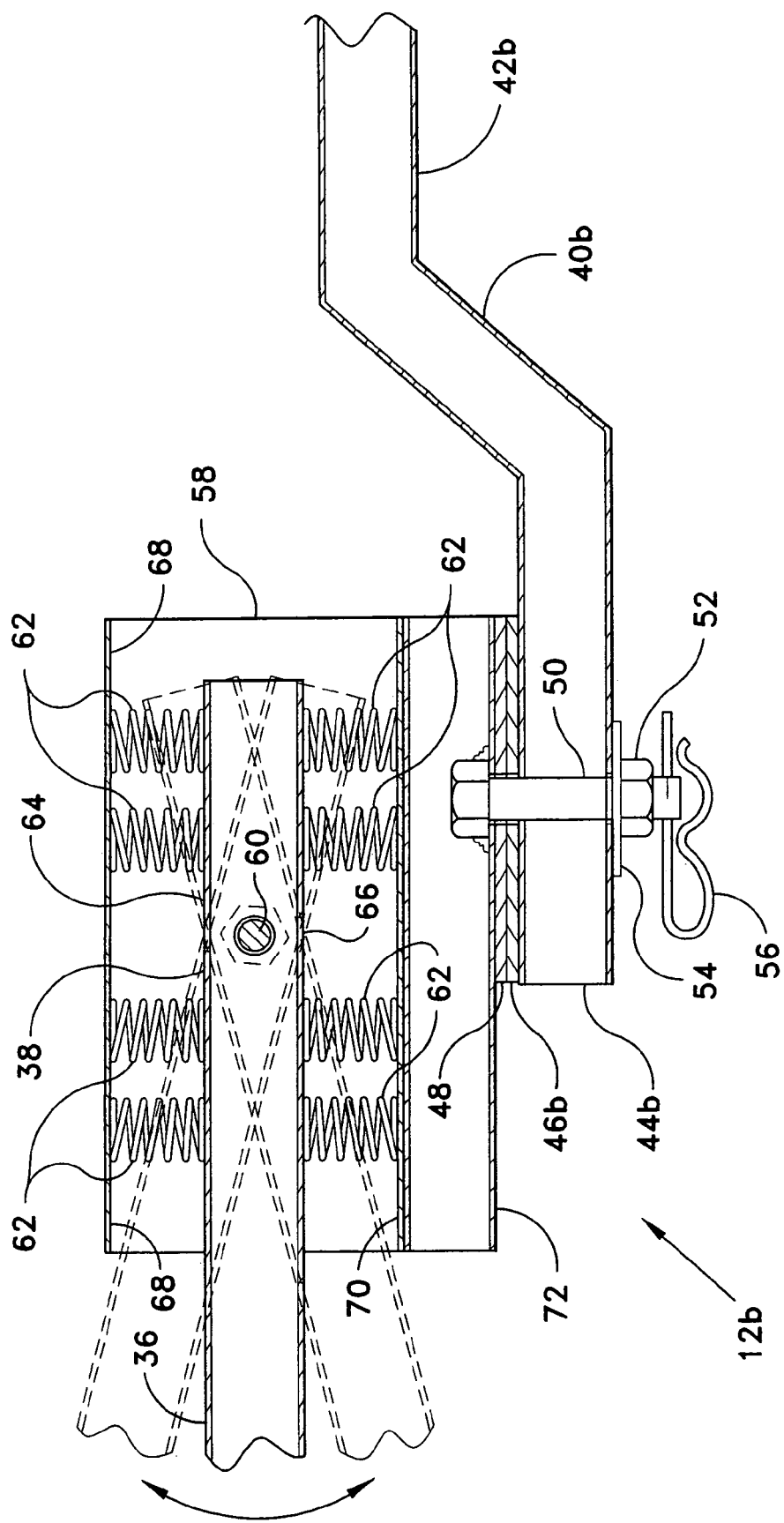
FIG. 3 is a detailed right side elevation view in section of the hitch assembly of the present invention, illustrating further details thereof.

FIG. 2 of the drawings provides an exploded perspective view of a first embodiment stabilizing hitch 12a, with FIG. 3 being a side elevation view in section of an alternate embodiment stabilizing hitch 12b of the present invention. The two hitches 12a and 12b differ only in their respective hitch arms 40a and 40b, which serve to attach the hitches to the tow vehicle V.

The longitudinal frame member 14 of the trailer 10a includes a trailer tongue 36 extending forwardly therefrom. The tongue 36 may be an extension of the frame member 14, or may be fabricated as a separate component, as desired. The tongue 36 has a forwardly distal end 38 which engages the hitch assembly 12a or 12b, as shown in FIGS. 2 and 3.

An elongate hitch arm includes a tow vehicle attachment end and an opposite trailer tongue attachment end, with a tow vehicle mounting plate extending horizontally from the trailer tongue attachment end of the hitch arm. FIGS. 2 and 3 illustrate two different configurations of the hitch arm, with the other components being identical in the two Figures. In FIG. 2, the hitch arm 40a is formed of a flat sheet of heavy gauge material, with its tow vehicle attachment end 42a having holes for attachment to the location of a conventional ball-type trailer hitch, once the ball has been removed from the towing vehicle V. The opposite trailer tongue attachment end 44a has its tow vehicle mounting plate 46a extending therefrom formed by the same metal plate as the hitch arm 40a. The hitch assembly of FIG. 3 includes a hitch arm comprising a rectangular tube or bar 40b to fit a conventional receiver hitch R of the type generally shown in FIG. 1. The hitch arm 40b of FIG. 3 includes a forwardmost tow vehicle attachment end 42b which fits into a conventional receiver hitch R socket, and an opposite trailer tongue attachment end 44b. The tow vehicle mounting plate 46b is welded or otherwise permanently and immovably affixed to the tongue attachment end 44b of the hitch arm 40b.

A generally horizontally disposed trailer tongue mounting plate 48 is pivotally secured to the tow vehicle mounting plate 46a or 46b (depending upon the hitch embodiment) by a mounting plate pivot bolt 50, which passes through concentric holes in the two plates 48 and 46a or 46b. A conventional nut and washer 52 and 54 are used to secure the bolt 50 through the plate holes, with a hitch pin 56 or the like being passed through the drilled end of the bolt 50 to prevent loss of the nut 52.

A trailer tongue box 58 is indirectly or directly secured to the trailer tongue mounting plate 48 (e.g., welded, etc.). The forward distal end 38 of the trailer tongue 36 inserts into the open rearward end of the rectangular box 58, and is secured therein by a laterally disposed trailer tongue attachment bolt 60 which passes through the sides of the box 58 and laterally through the forwardly distal end 38 of the trailer tongue 36, with a conventional nut 62, washer, hitch pin, etc. used to secure the tongue attachment bolt 60 through the box 58. The trailer tongue attachment box 58 may include a closed forward end if desired for additional lateral rigidity, or may be left open, as shown in FIG. 3.

The present stabilizing hitch mechanism 12a or 12b provides two degrees of angular freedom of motion for the hitch tongue 36 and trailer secured thereto. The two plates 46a (or 46b) and 48 bear against and rotate against one another to allow the trailer to turn laterally behind the towing vehicle V during turning maneuvers. The attachment of the forward distal end 38 of the trailer tongue 36 in the trailer tongue box by means of the lateral tongue attachment bolt 60, allows the trailer to move arcuately in pitch relative to the towing vehicle V as the assembly negotiates bumps and dips in the surface. However, the trailer tongue box 58 cannot roll laterally about the longitudinal or roll axis of the towing vehicle and trailer assembly, as it is immovably affixed to the tongue attachment plate 48, which is in turn pivotally affixed to the adjacent tow vehicle attachment plate 46a or 46b. This plate 46a or 46b cannot roll laterally due to its being immovably affixed to the tow vehicle V. Thus, the trailer 10 cannot roll laterally to either side due to its tongue being pinned in place laterally by the bolt 60 through the tongue box 58.

While the trailer 10a is free to pitch upwardly and downwardly relative to the tow vehicle V (within the limits of the forward end 38 of the tongue 36 engaging the upper and lower sides of the tongue box 58), it may be desirable to dampen such pitching motions by some means in addition to the wheels and suspension of the towing vehicle V and trailer 10a. FIGS. 2 and 3 illustrate such pitch damping means, comprising a series of coil springs 62 which are affixed (e.g., welded, etc.) to the upper and lower sides or surfaces 64 and 66 of the forward end 38 of the trailer tongue 36. These springs 63 bear against the inner surfaces of the upper and lower sides or surfaces 68 and 70 of the trailer tongue box 58 to dampen any pitch oscillations which may occur between the towing vehicle V and trailer 10a (or other trailer type configured for use with the present hitch 12a or 12b). It will be seen that other resilient means may be used between the forward tongue end 38 and the upper and lower surfaces 68 and 70 of the box 58, e.g., rubber inserts, pneumatic bags, etc., as desired.

It will be seen that the present hitch embodiments may be modified somewhat over those shown in the drawings. For example, while the vertically disposed mounting plate pivot bolt 50 is shown extending downwardly below the tongue box 58, with the laterally disposed tongue attachment bolt 60 above the pivot bolt 50, the assembly could be inverted if so desired, with the vertical pivot axis above the horizontal axis. Also, the present hitches have been described to this point without any intervening structure between the tongue box 58 and the underlying trailer tongue mounting plate 48. As the mounting plate pivot bolt 50 extends upwardly from the trailer tongue mounting plate 48, it will be seen that the head of the bolt 50 may interfere with the lower pitch damping springs 62 bearing against the inner floor 70 of the trailer tongue box 58, particularly as the trailer tongue 38 with its springs 63 extending therefrom is inserted into the tongue box 58. Accordingly, a separate mounting plate pivot bolt attachment box 72 may be affixed directly to the trailer tongue mounting plate 48, with the head of the bolt 50 extending upwardly therein. The trailer tongue box 58 may then be affixed (welded, etc.) to the pivot bolt attachment box 72 to provide a smooth floor within the tongue box 58. The pivot bolt attachment box 72 may be provided as a channel, as shown by the broken line upper edges in FIG. 2, to facilitate the installation of the bolt 50 therein. The floor 70 of the trailer tongue box 58 serves as the closed upper side of the pivot bolt attachment box 72 when secured thereto.

The present stabilizing hitch may be used to tow single wheel trailers having various configurations. The trailer 10a of FIG. 1 and the trailers 10b and 10c respectively of FIGS. 4 and 5 each include essentially the same basic structure, i.e., an elongate longitudinal frame member 14 having a forward end 16 and opposite rearward end 18 with a trailer tongue portion 36 extending forwardly therefrom and a series of crossmembers or lateral ribs 20 extending thereacross. Each of the trailers 10a, 10b, and 10c includes a trailing arm 22 having a forward end 24 secured to the frame member 14 by a pivot bracket 26, with an opposite rearward end 28 having a wheel fork 30 (or other wheel attachment structure) depending therefrom, with a wheel and tire assembly 32 rotatably mounted in the fork 30. A resilient suspension damper, e.g., concentric coil spring and shock absorber assembly 34 or other suitable means, is mounted between the frame member 14 and the trailing arm 22. Each of the trailers 10a, 10b, and 10c also includes a flat bed or upper surface 74 atop the frame member 14 and crossmembers 20, as well.

The trailer 10a of FIG. 1 is particularly configured for the carriage of bicycles thereon. A series of article support brackets 76a extends upwardly from the bed 74, to support the axles of a series of bicycles B thereon. The bed 74 of the trailer 10a may be made as wide as practicable, particularly when carrying a relatively light load such as a number of bicycles B. The axle supports or uprights 76a may be installed in order to stagger the bicycles B fore and aft and/or reversed directionally for handlebar clearance, as required. Other types of article support brackets may be installed upon the bed 74 of any of the configurations of the present single wheel trailer, as desired.

FIG. 4 provides a side elevation view of a trailer 10b having a slightly different configuration than that of the trailer 10a of FIG. 1. The underlying structures of the two trailers 10a and 10b are identical, as described further above. However, the trailer 10b includes a single, folding article support 76b at the rearward end of the bed 74. This support 76b may be used to support the rearward ends of elongate articles (e.g. lumber, pipe, etc.) extending rearwardly from the bed of a pickup truck or similar tow vehicle. Modest turns may be negotiated with such an assembly, as the present single wheel trailer is relatively small and short and the rearward end of the trailer is not displaced laterally to any great degree from the longitudinal axis of the tow vehicle during shallow turning maneuvers. FIG. 4 also discloses an optional cargo storage enclosure 78 installed atop the trailer bed 74. Such an enclosure 78 serves to protect and guard any articles stored therein, and may be made to be removable from the bed 74 or permanently installed thereon, as desired. Such relatively small and lightweight enclosures are conventional, as exemplified by the trailer of the '547 French Patent discussed further above, and may be installed with any of the single wheel trailers of the present invention as desired.

Figure 5:
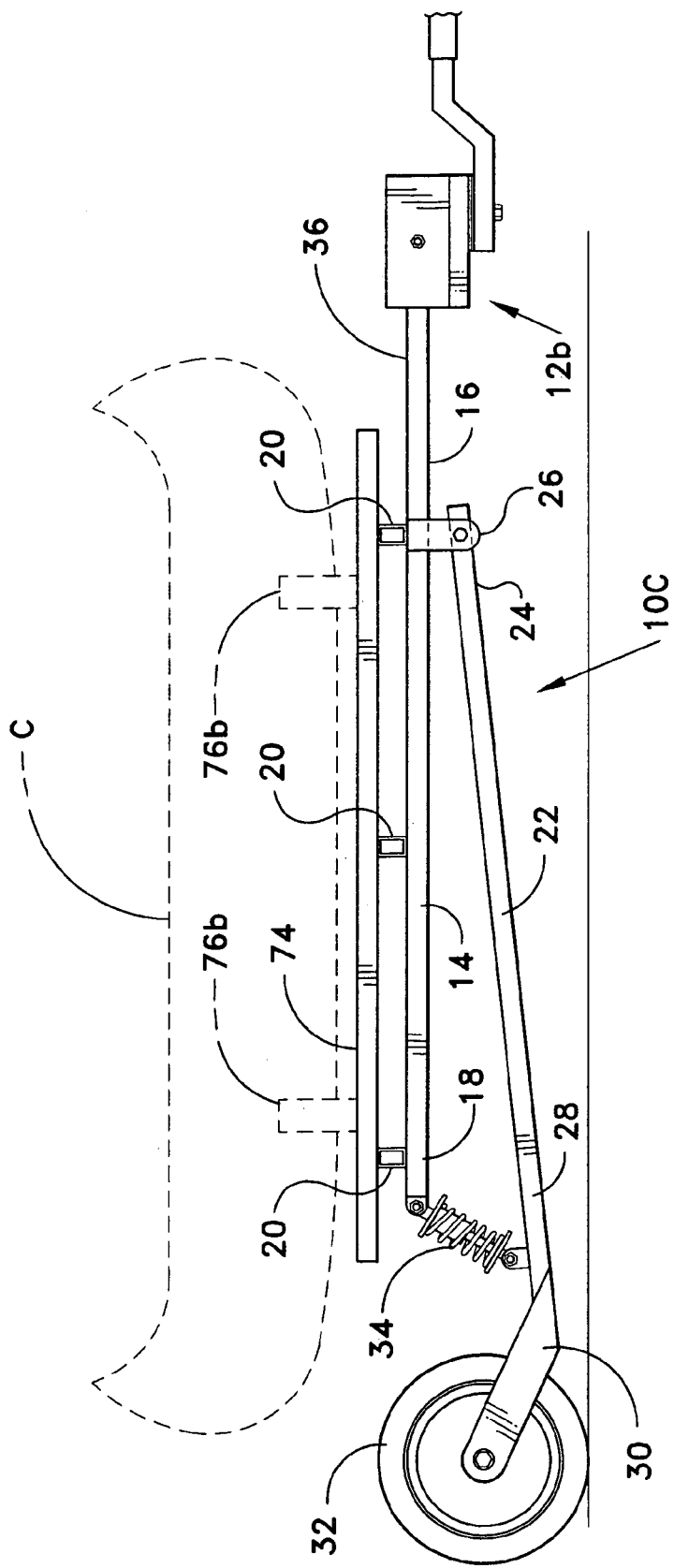
FIG. 5 is a right side elevation view of the present hitch assembly and another trailer embodiment having a different wheel and trailing arm suspension.

FIG. 5 illustrates yet another single wheel trailer embodiment according to the present invention, designated as trailer 10c. The basic structure of the trailer 10c is similar to the structures of the trailers 10a and 10b of FIGS. 1 and 4, but it will be noted that the trailing arm 22 extends farther rearwardly, with the wheel support fork 30 extending rearwardly from the rearward end 28 of the trailing arm 22. The trailer bed 74 also includes optional article supports 76b extending upwardly therefrom, configured to support a canoe C. Again, various relatively lightweight articles may be carried upon any of the present trailers by means of relatively straightforward modifications to the trailer bed and/or article supports, as required.

Figure 6:
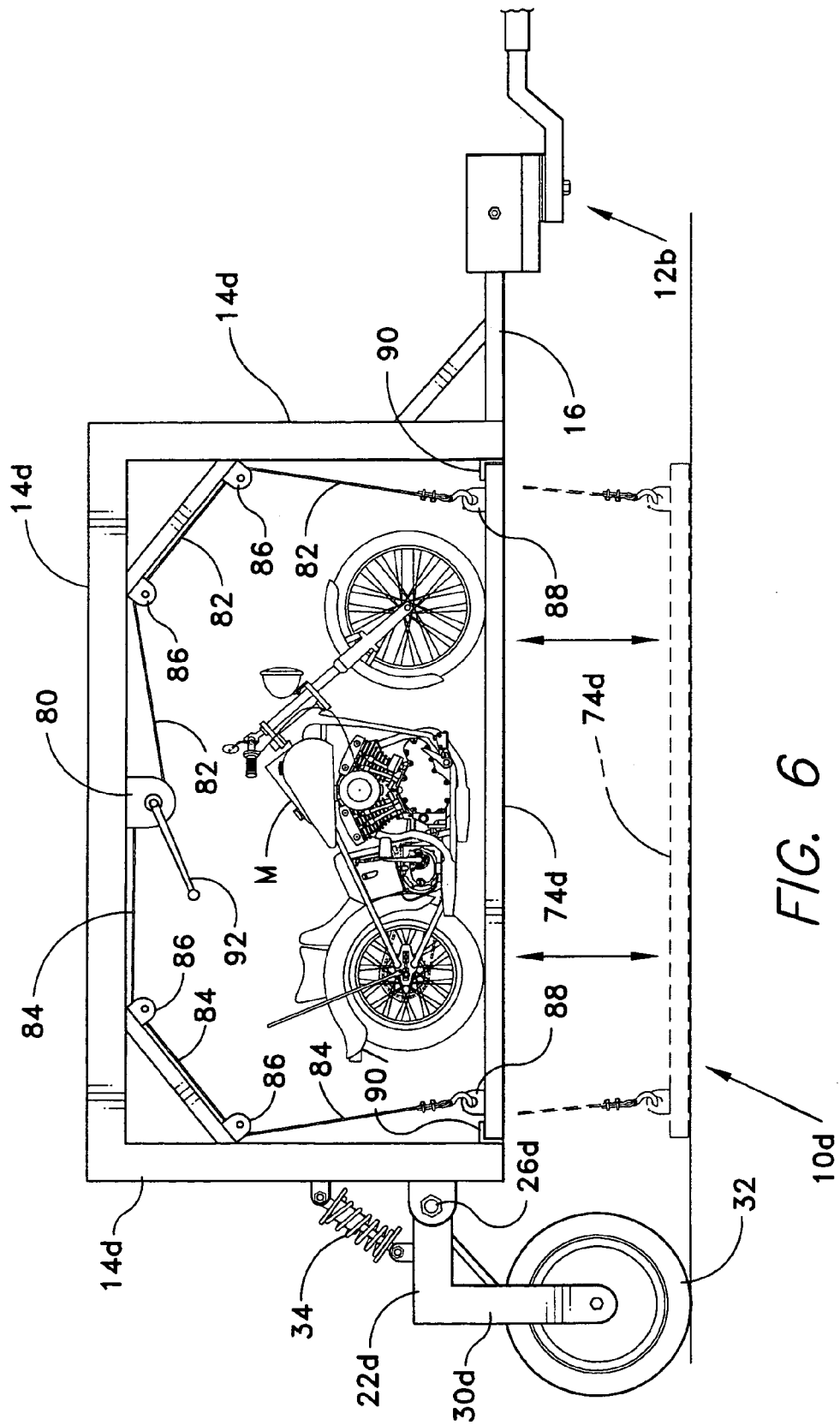
FIG. 6 is a right side elevation view of the present hitch assembly and yet another trailer embodiment having an adjustable height bed for lowering to the surface during loading and unloading.

FIG. 6 provides a right side elevation view of still another single wheel trailer configuration, designated as trailer 10*d*. The trailer 10*d* of FIG. 6 includes a vertically adjustable bed 74*d*, unlike other trailers of the present invention. The towing configuration is essentially the same as the other trailers, with the forward end 16 of the longitudinal frame terminating in a forward distal tongue which installs in the stabilizing hitch of the present invention, e.g., a hitch configuration 12*b*, as shown in FIG. 6. However, the frame 14*d* differs from the straight longitudinal frame members 14 of the other trailers of FIGS. 1, 4, and 5, in that the frame 14*d* comprises a three-sided rectangular structure which extends over and across the length of the vertically adjustable bed 74*d*. The trailing arm 22*d* extends from a suspension arm pivot bracket 26*d* which trails from the rearward upright member of the frame 14*d*, with the wheel mounting fork 30*d* extending generally at a right angle to the trailing arm 22*d* to form a generally L-shaped assembly. The movements of the suspension arm 22*d*, wheel fork 30*d*, and wheel and tire assembly 32 therein, are damped by a resilient member 34, e.g., a spring and shock absorber assembly similar to that used with the other trailer embodiments of the present invention.

The upper central member of the frame 14*d* includes a winch 80 which is connected to the vertically adjustable bed or platform 74*d* by forward and rearward cables 82 and 84. (Dual cables may be provided at each end to support each corner of the bed 74*d* for stability, but the left and right lateral cable pairs show as only a single cable 82 and 84 due to the side elevation orientation of FIG. 6.) The cables 82 and 84 pass through a series of pulleys or guides 86 and attach to the platform or bed 74*d* at appropriate eyes or anchors 88. Corner angles or brackets 90, or mating pins and receptacles, etc., may be provided between the edges of the bed 74*d* and the frame 14*d* to stabilize the bed 74*d* to prevent swaying of the bed during towing operations.

The lack of sides for the present single wheel trailer configuration greatly facilitates the loading and unloading of various articles thereon, with loading and unloading made even easier by means of the lowering bed or platform 74*d* of the trailer embodiment 10*d* of FIG. 6. Loading and unloading relatively heavy and bulky articles weighing perhaps several hundred pounds, e.g., a large motorcycle M is easily handled by one person using the present trailer 10*d* of FIG. 6. The platform or bed 74*d* is lowered to the surface using the winch 80 (which may be a manually actuated winch using a hand crank 92, or electrically or hydraulically powered, as desired) and the article placed upon the bed 74*d*. In the case of a large, heavy, and/or bulky wheeled device, e.g. the motorcycle M, a single person may roll the device onto the platform 74*d* and maneuver it into position as required. Conventional tiedown points or other anchors, braces, etc. (not shown) may be used to secure the device to the platform or bed 74*d* for towing. The winch 80 is then used to raise the bed or platform 74*d*, with the stabilizing braces or stops 90 precluding swaying or other movement of the bed 74*d* during towing when the bed 74*d* is raised securely against the stops 90. When the destination is reached, the operation is reversed to lower the bed or platform 74*d* to the underlying surface, and the cargo removed easily from the lowered bed. The bed 74*d* may then be raised again for further towing operations.

In conclusion, the present single wheel trailer and stabilizing hitch provide a much improved means for hauling and towing relatively light loads of perhaps up to several hundred pounds or so. With the hitch precluding lateral rolling of the trailer about its longitudinal axis, only a single wheel is needed, with corresponding reductions in cost and in tire, suspension, and brake wear and rolling resistance, and corresponding increases in fuel mileage for the towing vehicle. The present trailer may be constructed in a variety of different configurations or embodiments, but the lack of sides provides another benefit in that the trailer bed or platform may be lowered beneath an overhead trailer frame in order to further facilitate loading and unloading of the trailer. Accordingly, the present single wheel trailer and stabilizing hitch will provide great utility for many persons who have occasion to tow relatively small and/or light loads using a lightweight utility trailer.

It is to be understood that the present invention is not limited to the embodiments described above, but encompasses any and all embodiments within the scope of the following claims.

I claim:

1. A single wheel trailer and stabilizing hitch therefor, comprising:

a trailer frame having at least a forward end and a rearward end opposite the forward end;

a trailing suspension arm having a trailer frame attachment end and a wheel attachment end opposite the trailer frame attachment end, said arm pivotally extending from said trailer frame;

a single wheel and tire extending from the wheel attachment end of said trailing suspension arm;

a trailer tongue extending from the forward end of said trailer frame, said tongue having a forward, distal end;

a hitch arm having a tow vehicle attachment end and a trailer tongue attachment end opposite the tow vehicle attachment end;

a tow vehicle mounting plate extending generally horizontally from the trailer tongue attachment end of said hitch arm;

a trailer tongue mounting plate pivotally secured to said tow vehicle mounting plate;

a mounting plate pivot bolt disposed through said tow vehicle mounting plate and said trailer tongue mounting plate;

a trailer tongue box extending from said trailer tongue mounting plate;

a trailer tongue attachment bolt disposed laterally through said trailer tongue box and the forward, distal end of said trailer tongue captured within said trailer tongue box; and a mounting plate pivot bolt attachment box disposed between said trailer tongue mounting plate and said trailer tongue box.

2. The single wheel trailer and stabilizing hitch combination according to claim 1, wherein the forward, distal end of said trailer tongue has opposed upper and lower sides, the combination further including a plurality of trailer pitch damping compression springs extending from the upper and lower sides of the forward, distal end of said trailer tongue.

3. The single wheel trailer and stabilizing hitch combination according to claim 1, further including a resilient suspension mechanism disposed between said trailing arm and said trailer frame.

4. The single wheel trailer and stabilizing hitch combination according to claim 1, further including a bed extending across said trailer frame.

5. The single wheel trailer and stabilizing hitch combination according to claim 4, further including a storage enclosure disposed atop said bed.

6. The single wheel trailer and stabilizing hitch combination according to claim 4, further including at least one article support bracket extending from said bed.

7. The single wheel trailer and stabilizing hitch combination according to claim 4, further including a trailer bed raising and lowering mechanism disposed upon said trailer frame.

8. The single wheel trailer and stabilizing hitch combination according to claim 1, wherein said hitch arm is selected from the group consisting of flat plates and rectangular section receiver hitch bars.

9. The single wheel trailer and stabilizing hitch combination according to claim 1, wherein:
   said trailer tongue mounting plate is disposed above said tow vehicle mounting plate; and
   said trailer tongue box is disposed atop said trailer tongue mounting plate.

\* \* \* \* \*